United States Patent

[11] 3,563,185

[72] Inventors Douglas G. K. Wilmot
 Creve Coeur;
 Robert M. Seely, Florissant; Richard L. Lich, Town and Country, Mo.
[21] Appl. No. 743,178
[22] Filed July 8, 1968
[45] Patented Feb. 16, 1971
[73] Assignee General Steel Industries, Inc.
 St. Louis, Mo.

[54] RAILWAY LOCOMOTIVE TRUCK
 17 Claims, 3 Drawing Figs.
[52] U.S. Cl. ........................................... 105/199;
 105/135, 105/136, 105/171, 105/182, 105/200, 105/202, 105/208
[51] Int. Cl. ........................................... B61f 5/14, B61f 5/16, B61f 5/22
[50] Field of Search ........................................ 105/171, 182, 192, 199, 200, 135, 136, 202, 208; 105/164, 197, 224

[56] References Cited
 UNITED STATES PATENTS

| | | | |
|---|---|---|---|
| Re21,987 | 12/1941 | Green | 105/200 |
| 3,286,656 | 11/1966 | Lich | 105/199 |
| 2,861,522 | 11/1958 | Rossell | 105/171 |
| 2,877,719 | 3/1959 | Lich | 105/197 |
| 2,918,022 | 12/1959 | Kolesa et al. | 105/224X |
| 2,925,790 | 2/1960 | Lich | 105/199X |
| 2,988,015 | 6/1961 | Lich | 105/182 |
| 3,013,507 | 12/1961 | Stein | 105/182 |
| 3,208,402 | 9/1965 | Bingham | 105/164X |

FOREIGN PATENTS

| | | | |
|---|---|---|---|
| 1,080,769 | 8/1967 | Great Britain | 105/199F |

Primary Examiner—Arthur L. La Point
Assistant Examiner—Howard Beltran
Attorney—Bedell and Burgess ABSTRACT: A railway motor truck for swivelly supporting a vehicle body and connected to the same for the transmission thereto of draft and braking forces at a sufficiently low level to minimize load transference between the axles. The truck comprises a rigid frame resiliently supported on the axles and a transverse bolster supported on the frame for swivel about its center. To provide for relative lateral movement of the body with respect to the truck while preventing substantial vertical movement of the body on the bolster, flat elastomeric pad devices are carried by the bolster at the sides of the truck for directly supporting the body. To minimize the overall height of the truck, the truck frame side members are depressed between the axles and the bolster extends through the depressions. To stabilize the bolster and truck frame against tipping about a transverse axis with respect to each other, the bolster is supported on the truck frame side members by sliding bearings spaced apart longitudinally of the truck and located at opposite sides of the depressions in the truck frame side members. For transmitting longitudinal draft and braking forces from the truck to the vehicle body substantially at rail level so as to minimize load transference, the bolster is connected to the vehicle body at each side by a single longitudinally upwardly and outwardly inclined link, so inclined that its axial projection intersects the transverse vertical central plane of the truck at or near track level. Both links extend in the same direction longitudinally of the truck from the bolster. The lower, or bolster end of each link is at a sufficiently high level above the track to conform to clearance limitations.

INVENTORS:
DOUGLAS G. K. WILMOT
ROBERT M. SEELY
RICHARD L. LICH

BY Bedell & Burgess
ATTORNEYS

INVENTORS:
DOUGLAS G. K. WILMOT
ROBERT M. SEELY
RICHARD L. LICH

BY Bedell & Burgess
ATTORNEYS 3,563,185

RAILWAY LOCOMOTIVE TRUCK

BACKGROUND OF THE INVENTION

The invention relates to railway rolling stock and consists particularly in a motor truck arranged for draft connection to a vehicle body such that load transference between the axles is minimized. In railway motor trucks of the type in which a bolster is swivelly supported on the truck frame between the axles and supports the body by means of springs carried on the ends of the bolster, draft forces are conventionally transmitted to the body at each side by a single longitudinally extending horizontal link connecting the bolster to the body. Because of clearance limitations, such draft links must be positioned a substantial distance above track level, thus providing a vertical moment arm through which traction forces generated by the engagement of the wheels and rails would act to reduce the load on the forward axle and increase the load on the rear axle, with consequent adverse effect on the performance of the truck.

SUMMARY OF THE INVENTION

The invention minimizes load transference in trucks of the type described above by providing a single draft link at each side extending in the same direction longitudinally of the vehicle from the bolster, the axial projections of each draft link intersecting the transverse vertical central plane of the truck at a low level, preferably at track level, so as to eliminate any vertical moment arm through which tractive forces generated by the engagement of the wheels and the rails would otherwise act to transfer load from one axle to the other. To minimize the possibility of fore and aft movements being transmitted to the truck by vertical pivotal movements of the links and provide for relative lateral movements of the body on the bolster and to cushion vertical shocks and reduce transmission of vibration and noise from the truck to the body, elastomeric pads yieldable in shear are mounted on the bolster at the sides of the truck and directly support the body.

DESCRIPTION OF THE PREFERRED EMBODIMENTS

Figure 1:
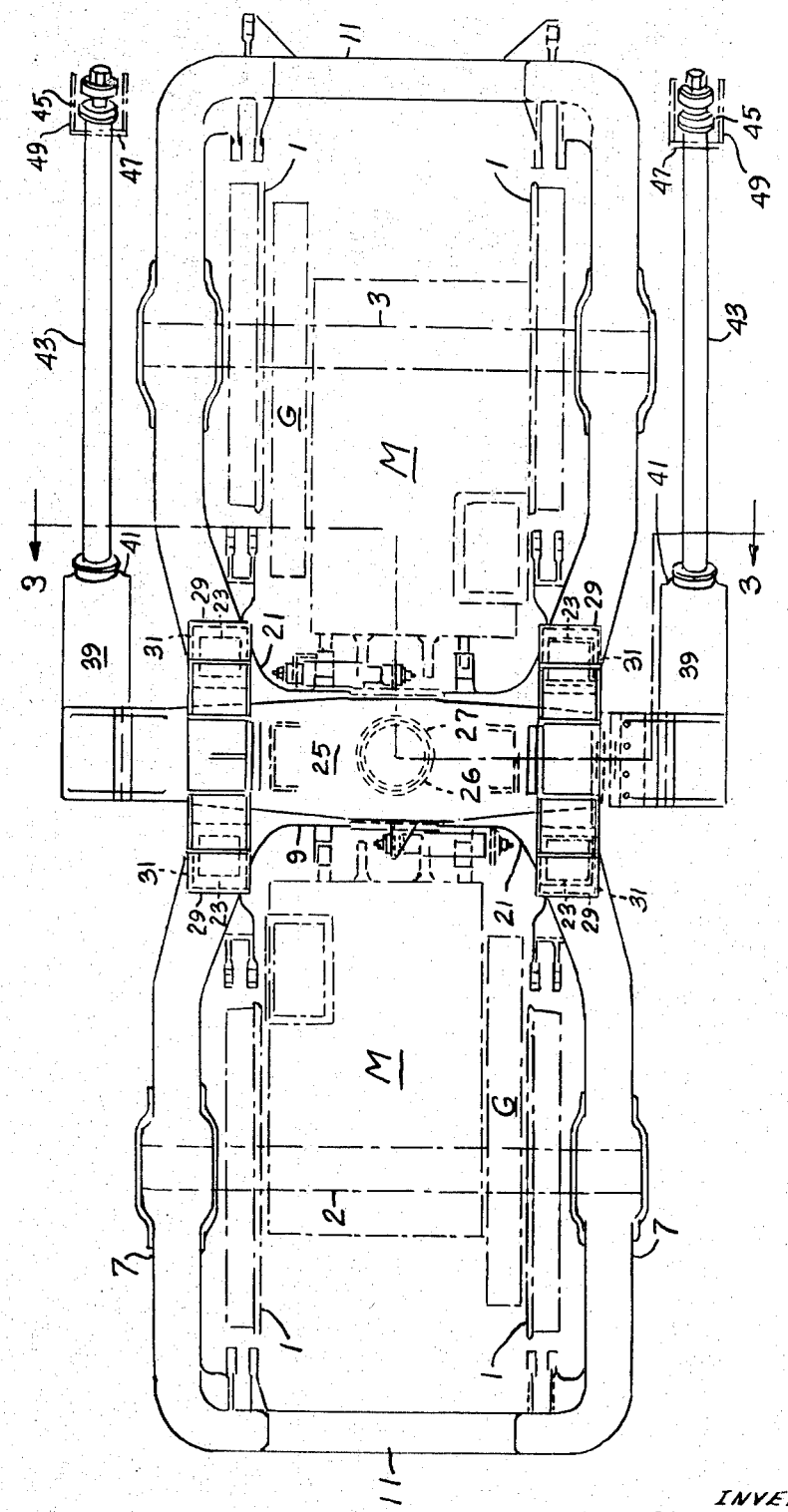
FIG. 1 is a plan view of a truck embodying the invention.
Figure 2:
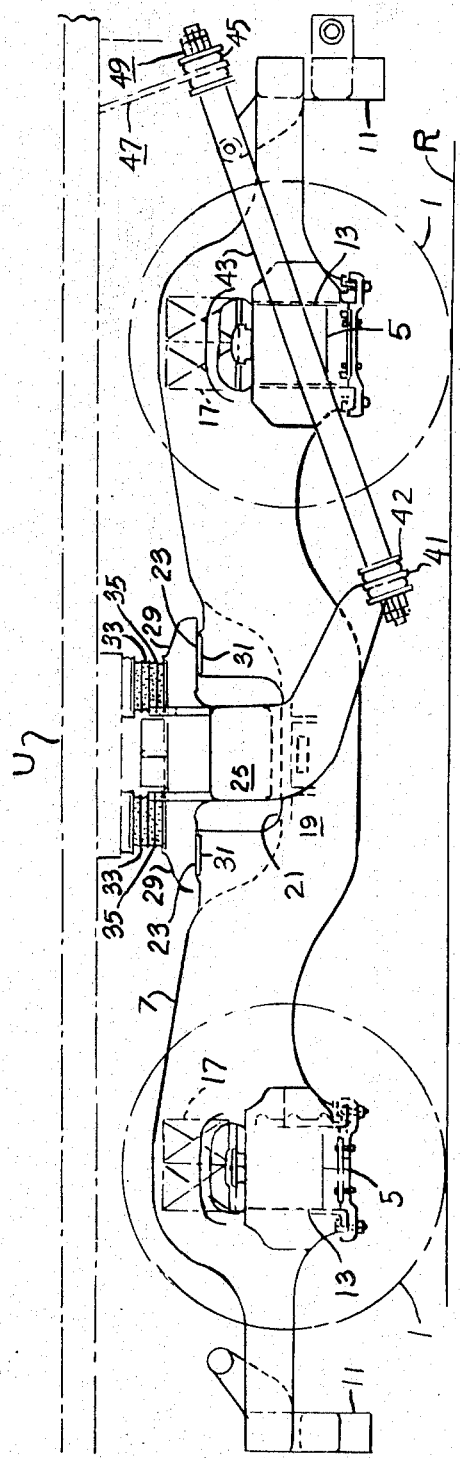
FIG. 2 is a side elevation view of the truck illustrated in FIG. 1.
Figure 3:
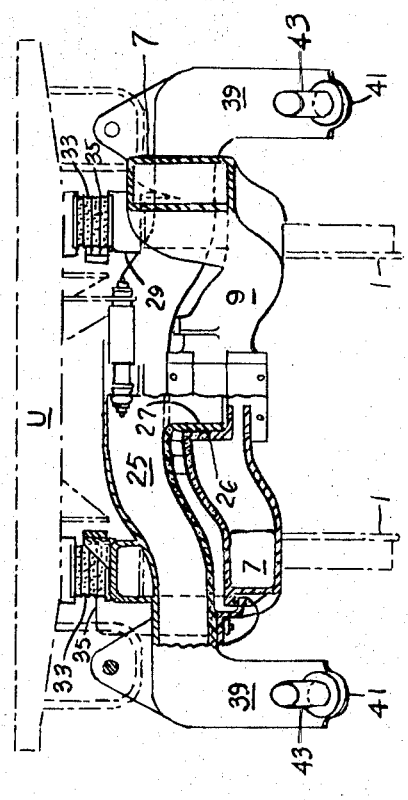
FIG. 3 is a transverse vertical sectional view along line 3–3 of FIG. 1.

The numeral 1 indicates railway flanged wheels mounted in spaced pairs on spaced, parallel axles 2 and 3. At their ends outboard of wheels 1, axles 2 and 3 are rotatably received within journal boxes 5.

A rigid truck frame, preferably of one-piece cast steel construction, comprises transversely spaced longitudinally extending side members 7 positioned transversely outboard of wheels 1 and rigidly connected to each other by transverse center transom 9 intermediate axles 2 and 3, and end transoms 11 located longitudinally outboard, respectively, of axles 2 and 3. Frame side members 7 are vertically apertured adjacent journal boxes 5 to form pedestal jaws 13. Journal boxes 5 are vertically slidably received in jaws 13, whereby the axles are maintained transverse of the truck frame, and upright springs 17, seated on journal boxes 5, underlyingly by support frame side members 7 in the conventional manner and effectively oppose tipping of the truck frame longitudinally with respect to the track by reason of their spacing longitudinally of the truck.

Longitudinally intermediate the axles each of the frame side members is depressed to a low level as at 19, and center transom 9 is located at the same level, a recess 21 thus being formed in the upper surface of the frame side members.

For permitting swivel between the truck and supported vehicle body underframe U, center transom 9 is formed at its center with a vertical cylindrical recess 26 and frame side members are formed at the opposite sides of each recess 21 with upwardly facing flat horizontal bearing surfaces 23.

A transverse bolster 25 is formed with a depending cylindrical boss 27 pivotally received within recess 26. Bolster 27 is parallel to and slightly spaced vertically from the upper surface of center transom 9 and extends outwardly of the truck frame through recesses 21 in frame side members 7. For supporting bolster 25 on the truck frame and for stabilizing the truck frame and bolster against tipping longitudinally of the truck with respect to each other, the latter is provided, in the region in which it passes through the truck frame side member recesses 21, with forwardly and rearwardly extending wings 29, formed with downwardly facing flat horizontal bearing surfaces 31 slidably seated on upwardly facing frame side member bearing surfaces 23, the substantial distance between bearings 23, 31 at each side of the bolster lengthwise of the truck thus providing an arm opposing tendencies of the truck frame and bolster to tip longitudinally of the truck with respect to each other. The transverse and longitudinal spacing of bearing surfaces 23, 31 prevents tilting of the bolster and truck frame about transverse and longitudinal axes with respect to each other.

For supporting underframe U on bolster 25, so as to accommodate substantial relative lateral movements of the underframe with respect to the bolster whereby to cushion lateral forces applied to the truck from lateral irregularities in the rail, a pair of sandwich devices each comprising a plurality of flat horizontal elastomeric pads 33 interleaved and bounded by flat metal plates 35 are seated on the upper surfaces of bolster wings 29 and are thus spaced apart longitudinally of the truck, underframe U being seated directly on the upper plates 35 of sandwiches 33, 35 and compressing the pads sufficiently to prevent substantial vertical movement of the underframe relative to the bolster. Because of the transverse spacing of sandwich devices 33, 35 from each other and the compression of the pads, tipping of the bolster about transverse axes with respect to the underframe will be prevented while the close spacing of the devices 33, 35 longitudinally of the truck will permit some longitudinal tipping of the bolster and truck frame as a unit with respect to the underframe, to accommodate the truck to vertical curvature in the track.

For transmitting longitudinal forces from the truck to the underframe at track level, whereby to eliminate any vertical moment arm through which tractive forces generated at rail level by the engagement of the wheels and rails, might act to transfer load from one axle to the other, the outwardly protruding ends of bolster 25 are bent downwardly longitudinally of the truck, as at 39, in the same direction as each other, and terminate at a level sufficiently above the rail to conform to clearance limitations and at a distance somewhat offset longitudinally of the truck from the transverse center plane thereof. Bolster end portions 39 terminate in transverse webs 41 whose planes are inclined slightly longitudinally of the truck and anchor links 43, which may be of similar construction to those disclosed in V.F. Green Reissue Patent 21,987, are connected at 42 to webs 41 and extend therefrom longitudinally of the truck and upwardly to a similar connection at 45 to a transverse slightly inclined web 47 of a bracket 49 depending from underframe U. Connections 42 and 45 are constructed to provide limited universal pivoting of the links. The inclination of anchor links 43 longitudinally of the truck is such that their axial projections intersect the transverse vertical central plane of the truck at a very low level, preferably at rail level. With this arrangement the effective point of connection of the anchor links to the truck structure is at the intersection of the anchor link projections with the transverse vertical central plane of the truck just as though the links were attached to the truck structure at this point, and thus draft forces generated by the engagement of the wheels and rail surface are transmitted from the truck to the underframe at the same level, so as to eliminate any vertical moment arm about which load transference from axle to axle would otherwise occur.

The truck is powered by a pair of electric traction motors M journaled respectively on axles 2 and 3 and supported by their noses on opposite sides of center transom 9. Gear boxes G transmit driving torque from motors M to the associated axles.

Operation of the truck as applied to a double-truck locomotive is as follows:

Traction motors M drive axles 2 and 3 through gear boxes G and the tractive forces, generated by the engagement of wheels 1 with the rails R are transmitted through journal boxes 5, and pedestals 13 to the truck frame, and through truck frame center transom 9 to bolster 25 by means of pivot elements 26, 27. Bolster 25 is held against substantial vertical or lateral tilting movements relative to underframe U by the resistance of pad devices 35, 35 to compression and their spacing transversely of the truck, and the truck frame 7, 9, 11 is stabilized against any substantial vertical or tilting movements relative to the bolster by the transverse and longitudinal spacing of bearings 23, 31. Tractive forces, transmitted from the wheels to the bolster, as described above, are transmitted from the bolster to the underframe at the effective point of connection of inclined links 43 to the bolster, i.e., at track level, thus eliminating any vertical moment arm through which traction forces at track level would otherwise produce load transference from one axle to the other. Lateral forces applied to the wheels by transverse irregularities in the track rails would be cushioned by the shear yieldability of pad devices 33, 35 by which limited lateral movement of the underframe U relative to bolster 25 would be permitted, such movement being accommodated by limited angling of links 43 transversely of the truck. Because of the opposition of pad devices 33, 35 to relative vertical movement of the underframe and bolster, no substantial vertical movement will occur and the vertical triangles defined by the anchor link axes, the central transverse vertical plane of the truck, and the underframe will not be deformed and cause longitudinal reciprocation of the truck relative to the underframe and oscillation of the bolster about its swivel axis as would occur were the underframe conventionally supported by springs for substantial vertical movement on the bolster.

The truck may be modified in various respects as will occur to those skilled in the art and the exclusive use of all modifications as come within the scope of the appendant claims is contemplated.

We claim:

1. A railway locomotive truck comprising spaced wheeled axles, truck framing supported thereon, a transverse bolster supported on said framing intermediate said axles for swiveling movement about a vertical axis at the center of said framing, means on said bolster for supporting a locomotive underframe, said supporting means being horizontally yieldable and vertically substantially nonyielding under load whereby to permit relative lateral movements of said underframe on said bolster but preventing substantial relative vertical movements therebetween, a pair of longitudinally extending links one at each side of the truck each connected at its one end to an end of said bolster and adapted for connection at its other end to a supported underframe, said links being inclined upwardly from their connections to said bolster and their axes intersecting the transverse central plane of the truck at a level substantially lower than said bolster.

2. A railway locomotive truck according to claim 1, in which said links are provided with universal pivotal connections at each of their ends for connection respectively to said bolster and to a supported underframe.

3. A railway locomotive truck according to claim 1 in which the connections of said links to said bolster are offset longitudinally of the truck from said bolster toward the underframe connection ends of said links.

4. A railway locomotive truck according to claim 3, wherein the connections of said links to said bolster are offset downwardly with respect to the central portion of said bolster.

5. A railway locomotive truck according to claim 1 wherein the inclination of said links longitudinally of the truck is such that the axial projections of said links intersect the central transverse plane of the truck substantially at rail level.

6. A railway locomotive truck according to claim 1 in which said underframe supporting means comprise horizontal elastomeric pad devices arranged to support the underframe at points spaced apart a substantial distance transversely of the truck.

7. A railway locomotive truck according to claim 6 wherein said bolster is formed at its center with a depending boss of vertical cylindrical shape and said swivel bearing in said transom structure is a cylindrical recess therein adapted to matingly receive said bolster cylindrical boss.

8. A railway locomotive truck according to claim 1 in which said framing is a rigid frame resiliently supported on said axles, there being means slidably supporting said bolster on said frame at points spaced apart transversely and longitudinally thereof.

9. A railway locomotive truck according to claim 8 wherein said frame includes longitudinally extending side members spaced apart transversely and being depressed intermediate their ends to form transversely open recesses, transverse transom structure connecting said side members at the level of said recesses and forming a swivel bearing for said bolster at its center, said bolster overlying said transom and extending through said recesses in said side members, opposing horizontal bearings on said bolster and the top surfaces of said side members adjacent both ends of said side member recesses for supporting said bolster on said truck frame and preventing relative tipping movements therebetween longitudinally and transversely of the truck.

10. A railway locomotive truck according to claim 9 wherein s aid bolster is narrower than said recesses and has projections at both its sides overlying said side members adjacent the ends of said recesses, said bolster horizontal bearings being formed on said projections.

11. A railway locomotive truck according to claim 9 wherein outwardly of said frame side members said bolster is formed at each end with a bracket extending longitudinally of the truck from the bolster in the same direction as said links, said brackets providing at their terminals the bolster connections of said links.

12. A railway locomotive truck according to claim 11 wherein said brackets also extend downwardly from said bolster.

13. A railway locomotive truck according to claim 8 wherein said frame includes longitudinally extending tansversely spaced side members and said bolster supporting means comprise opposing horizontal bearings on said frame side members and said bolster.

14. A railway locomotive truck according to claim 13 wherein said underframe supporting means are in vertical alignment with said frame side members.

15. A railway locomotive truck according to claim 14 in which said underframe supporting means comprise horizontal elastomeric pad devices seated on the top surface of the bolster.

16. A railway locomotive truck according to claim 14 wherein said elastomeric pad devices comprise a plurality of flat elastomeric pads and flat metal plates interleaving said pads.

17. A railway locomotive truck according to claim 13 wherein said bolster end portions are disposed outboard laterally of the frame side members and extend downwardly therefrom and longitudinally of the truck toward the ends of said links remote from the bolster connections thereof, the bolster connections of said links being to the terminals of said bolster end portions.